(12) United States Patent
Shah et al.

(10) Patent No.: US 9,869,385 B1
(45) Date of Patent: Jan. 16, 2018

(54) POWDER METAL NET SHAPE ALIGNMENT FEATURE

(71) Applicant: Toyota Motor Engineering & Manufacturing North America, Inc., Erlanger, KY (US)

(72) Inventors: Shail N. Shah, Ann Arbor, MI (US); Nicholas S. Vernon, Brighton, MI (US); Sean I. Hayes, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/219,436

(22) Filed: Jul. 26, 2016

(51) Int. Cl.
*F16H 57/08* (2006.01)

(52) U.S. Cl.
CPC ................... *F16H 57/082* (2013.01)

(58) Field of Classification Search
None
See application file for complete search history.

(56) References Cited

U.S. PATENT DOCUMENTS

| | | | | |
|---|---|---|---|---|
| 3,939,736 A * | 2/1976 | Morin | ................... | F16H 57/082 475/331 |
| 5,098,358 A * | 3/1992 | Igaku | ................... | F16H 1/2836 475/335 |
| 5,382,203 A * | 1/1995 | Bellman | ............... | F16H 57/082 475/331 |
| 6,863,636 B2 * | 3/2005 | Huber | ................... | F16H 57/082 29/893 |
| 7,033,301 B2 | 4/2006 | Kimes | | |
| 7,556,583 B2 * | 7/2009 | Wang | ................... | F16H 57/082 475/331 |
| 8,042,247 B2 | 10/2011 | Dunkle et al. | | |
| 8,187,141 B2 * | 5/2012 | Goleski | ................. | F16H 57/082 475/331 |
| 8,491,439 B2 | 7/2013 | Kimes et al. | | |
| 8,491,440 B2 | 7/2013 | Kimes et al. | | |
| 8,523,550 B2 | 9/2013 | Wehrli et al. | | |
| 8,574,119 B1 * | 11/2013 | Kinter | ................... | F16H 57/082 475/331 |
| 9,034,246 B2 | 5/2015 | Voice | | |
| 9,121,276 B2 | 9/2015 | Heidecker et al. | | |
| 9,273,737 B2 * | 3/2016 | Heuver | ................... | F16H 57/08 |

(Continued)

FOREIGN PATENT DOCUMENTS

| | | |
|---|---|---|
| JP | 2016003672 | 12/2016 |
| JP | 2016003676 | 12/2016 |

*Primary Examiner* — Dirk Wright
(74) *Attorney, Agent, or Firm* — Christopher G. Darrow; Darrow Mustafa PC

(57) ABSTRACT

A powder metal component for a transmission includes a body portion defining a substantially planar major surface, and at least three radially spaced-apart retention features formed in the body portion in a green state, prior to sintering. Each retention feature may include a bore having a shaped geometry extending between an upper region adjacent the major surface of the body portion, and a lower region defining a radius of curvature. Each bore may be defined by two opposing, substantially parallel sidewalls and a substantially U-shaped bottom portion. The U-shaped bottom portion may include a center region defining the radius of curvature connecting two angled bottom walls.

20 Claims, 14 Drawing Sheets

(56) References Cited

U.S. PATENT DOCUMENTS

| | | | |
|---|---|---|---|
| 2004/0235610 A1* | 11/2004 | Jang | F16H 57/082 475/331 |
| 2006/0275607 A1* | 12/2006 | Demir | B22F 7/06 428/408 |
| 2007/0081915 A1 | 4/2007 | Trasorras et al. | |
| 2009/0062058 A1 | 3/2009 | Kimes et al. | |
| 2012/0003443 A1 | 1/2012 | Gubanich et al. | |
| 2013/0252012 A1 | 9/2013 | Cooper et al. | |
| 2015/0047942 A1 | 2/2015 | Kimes et al. | |
| 2015/0061188 A1 | 3/2015 | Hasegawa et al. | |
| 2015/0314547 A1 | 11/2015 | Grobl et al. | |
| 2015/0367414 A1 | 12/2015 | Kronberger | |
| 2016/0061315 A1* | 3/2016 | Taylor | F16H 57/082 475/331 |
| 2016/0107235 A1 | 4/2016 | Wilkinson | |

\* cited by examiner

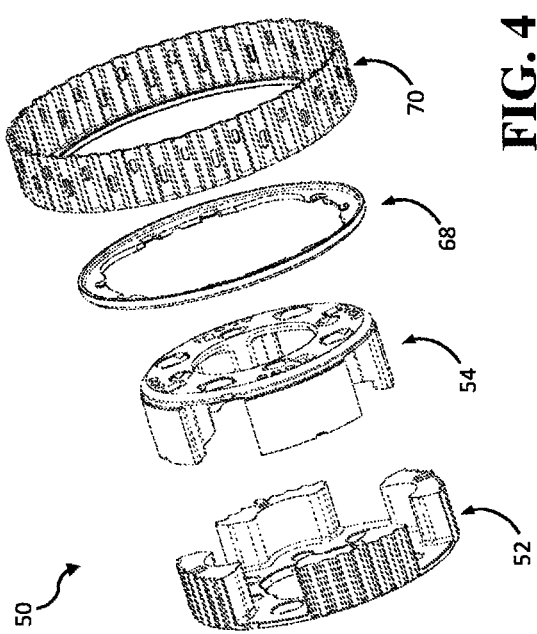

POWDER METAL NET SHAPE ALIGNMENT FEATURE

TECHNICAL FIELD

The present disclosure generally relates to a planetary carrier sub-assembly for a transmission, and more specifically, to powder metal components with net-shaped retention features for use with the alignment of rotational parts, as well as methods for making the same.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Transmission components must be high strength and suitable for high torque capacities. Powder metal transmission components provide several technical benefits, and are becoming more attractive from manufacturing strategies and perspectives. Typical powder metal carrier structures may include three or more pieces in order to accommodate the various pinion gears and related components. The pieces may include a cylindrical shell or drum, one or more support member, a backing plate, and various other optional or auxiliary-type structures. Various powder metal transmission components may need to be aligned with one another for coordinated rotational movement. For example, an automatic transmission carrier may have a cover, and another part may neighbor the cover along the carrier's axis, but rotate about the axis at a different speed than the carrier. In this example, a wear resistant thrust washer may be placed on this axis, between the cover and the neighboring part. To retain the thrust washer, the thrust washer may be provided with claws, and the cover may be provided with complementary retention features. Prior attempts at face-forming such retention features have not been successful, and have led to failures during part ejection and/or to stressing of the tools. Thus, such retention features are commonly formed by machining holes or bores in the powder metal cover component after the sintering process.

Generally, reducing the need for machining of parts in any assembly reduces part production costs, and the time required for manufacturing. Accordingly, there remains a need for improved powder metal component retention features that provide strength and ease of manufacture, with the ability to meet the high torque requirements needed for use in a transmission.

SUMMARY

This section provides a general summary of the disclosure, and is not a comprehensive disclosure of its full scope or all of its features.

In various aspects, the present teachings provide a powder metal component for a transmission that may include a body portion defining a substantially planar major surface, and at least three radially spaced-apart retention features formed in the body portion in a green state, i.e., prior to sintering. Each retention feature may include a bore having a shaped geometry extending between an upper region adjacent the major surface of the body portion, and a lower region defining a radius of curvature. Each bore may be defined by two opposing, substantially parallel sidewalls and a substantially U-shaped bottom portion. The U-shaped bottom portion may include a center region defining the radius of curvature connecting two angled bottom walls.

In other aspects, the present teachings provide a planetary carrier sub-assembly for aligning rotational components of an automatic transmission. The carrier sub-assembly includes a thrust washer comprising a plurality of claws, and a powder metal component. The powder metal component includes a body defining a substantially planar major surface, and at least three radially spaced-apart retention features formed in the body portion in a green state, prior to sintering. The retention features are configured for receiving the claws from the thrust washer for co-rotational movement with the thrust washer. Each retention feature may include a bore having a shaped geometry defined by two opposing, substantially parallel sidewalls and a substantially U-shaped bottom portion.

In still other aspects, the present teachings provide a method for forming a powder metal component with a plurality of net-shaped retention features therein. The method includes filling a die mold with a powder metal mixture. Once filled, the method includes applying a pressure to the powder metal mixture to shape a green compact including at least three spaced-apart retention features defined in a major surface of the green compact. Each retention feature may include a bore defined by two opposing, substantially parallel sidewalls and a substantially U-shaped bottom portion. The method continues by opening the die and allowing the green compact to expand in a radial direction aligned with a longitudinal axis of each retention feature, thereby minimizing interference between the green compact and protrusions extending from the die mold. The method includes sintering the green compact to form the powder metal component.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 4 is an exploded perspective view of the Ravigneaux carrier assembly of FIGS. 2 and 3;

Figure 1:
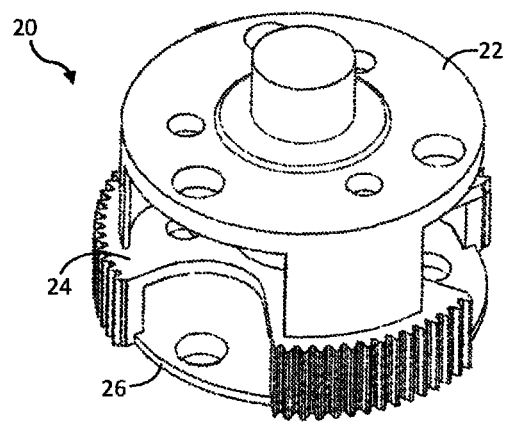
FIG. 1 is perspective view of an exemplary prior art, three-piece Ravigneaux carrier assembly.

It should be noted that the figures set forth herein are intended to exemplify the general characteristics of the methods and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

Planetary carrier assemblies may be used for accommodating various pinion gears and components of a transmission, and in particular, for an automatic automobile transmission. In various aspects, the present technology generally provides a powder metal component for a transmission that includes a body portion defining a substantially planar major surface, and at least three radially spaced-apart retention features formed in the body portion in a green state, prior to sintering. Each retention feature may include a bore defined having a shaped geometry extending between an upper region adjacent the major surface of the body portion, and a lower region defining a radius of curvature. Each bore may be defined by two opposing, substantially parallel sidewalls and a substantially U-shaped bottom portion. The U-shaped bottom portion may include a center region defining the radius of curvature connecting two angled bottom walls. In various aspects, the retention features are shaped and design to cooperate with one another to minimize the occurrence of cracking when exiting a die mold.

By way of context, it may be beneficial to couple a radial member or bearing member, such as a wear-resistant thrust washer, to at least one powder metal component of a transmission assembly in order to maintain low friction between neighboring transmission components moving along the same axis, but with different rotational velocities. Claws of the thrust washer would be received and retained by retention apertures defined in the powder metal component. The present technology focuses, in part, on the formation net-shaped retention features defined in a powder metal component, such as a cover member, when in a green compact state, for example, prior to sintering.

In various aspects, a planetary carrier assembly comprises two main sintered metal components. For example, the first main component of the carrier assembly may comprise a powder metal carrier member including a carrier plate having a plurality of carrier legs extending from the carrier plate. The second main component may comprise a powder metal cover member including a cover plate having a plurality of cover legs extending from the cover plate.

In certain aspects, it may be desirable that the carrier assembly be generally arranged such that respective ends of the carrier legs and ends of the cover legs are aligned with and brazed to one another. In the various arrangements, joining the carrier member with the cover member defines an interior of the carrier assembly configured to house various pinion gears, and joining the sleeve member to the carrier assembly provides an attachment point for other components, such as brake hubs and other auxiliary members.

The present technology can be used with various planetary gear trains and assemblies, including Ravigneaux planetary gear structures. By way of background, Ravigneaux planetary gear structures can be used in automatic transmissions to achieve a variety of gear ratios, and may include two tiers, or decks, of pinion gears that share a common carrier. FIG. 1 is perspective view of an exemplary prior art, three-piece Ravigneaux carrier assembly 20. As shown, the typical prior art carrier assembly 20 generally includes a support member 22, a cylindrical shell or drum 24, and a backing, or end plate 26.

Figure 2:
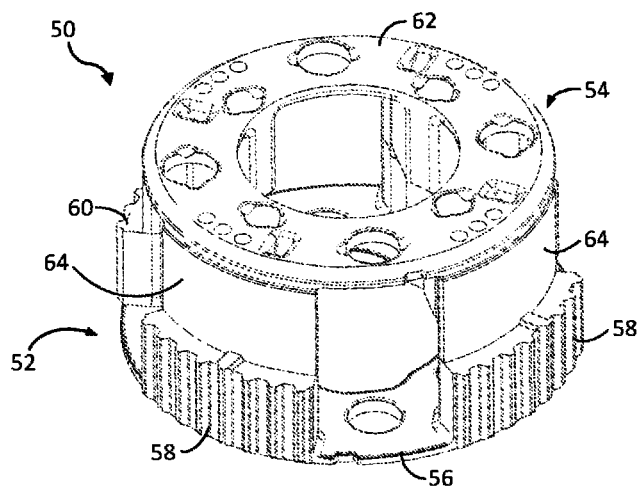
FIG. 2 is a perspective view of a Ravigneaux carrier assembly with a carrier member secured to a cover member according to various aspects of the present disclosure.

FIG. 2 is a perspective view of an exemplary two-piece Ravigneaux carrier assembly 50 with a powder metal carrier member 52 secured to a powder metal cover member 54 according to various aspects of the present disclosure.

In various aspects, the carrier member 52 may be a unitary, monolithic component (i.e., formed as one component), and includes a substantially circular carrier plate 56 portion including a plurality of angularly spaced-apart carrier legs 58 integral with the carrier plate 56. The carrier legs 58 may be provided with a substantially uniform length, extending to a free end 60. For example, a distance between an outer face 56a (see, FIG. 9) of the carrier plate 56 and the free end 60 of the carrier leg 58 may generally be the same for each spaced-apart carrier leg 58. Similar to the shape and design of the carrier plate 52, in various aspects, the cover member 54 may be a unitary, monolithic component (i.e., formed as one component), and includes a substantially circular cover plate 62 including a plurality of angularly spaced-apart cover legs 64 integral with the cover plate 62. The cover legs 64 may be provided with a uniform length, extending to a free end 66. For example, a distance between an outer face 62a (see, FIG. 7) of the cover plate 62 and the free end 66 of the cover leg 64 may generally be the same for each spaced-apart cover leg 64. The two-piece carrier assembly 50 is generally arranged such that respective ends 60 of the carrier legs 58 and ends 66 of the cover legs 64 are, at least partially, aligned with and secured to one another. In various aspects, the respective ends are joined together by braze joints that, by way of non-limiting example, can be formed during a sintering process using suitable brazing material. The arrangement of the carrier member 52 and the cover member 54 defines an interior 80 (see, FIGS. 5A, 5B) of the carrier assembly 50 configured to house various pinion gears and related components.

It should be understood that FIG. 2, and its related description, is with respect to one presently chosen embodiment, and various changes can be made to the design without impacting the overall function, purpose, and operation. In certain aspects, for example, the legs may have unequal sizes, shapes, and/or lengths, in whole or in part, but still form a two-piece carrier assembly. Further, although it may be preferable that the carrier member 52 and cover member 54 be monolithic, unitary components, there may be certain desirable aspects where at least a portion of the carrier member 52 or cover member 54 comprises two or more components mechanically (or otherwise) fastened, secured, or joined together.

Powder metallurgy techniques cover a wide range of ways in which materials or components are made from metal powders. As such, the powder metal compositions of the present technology can be tailored to specific or desired end uses. In various aspects, the carrier member 52 and the cover member 54 can comprise the same or substantially similar powder metal composition. In other aspects, it may be desirable that the carrier member 52 and the cover member 54 have different powder metal compositions.

In various aspects, it may be desirable for the carrier assembly 50 to also include auxiliary components that cooperate with functions of an automotive transmission. Non-limiting examples of auxiliary components may include sleeves, brake hubs, clutches, one way clutches, races, bearings, etc. Thus, the carrier assembly 50 may include at least one auxiliary component secured to one or both of the carrier member 52 and the cover member 54. It should be understood that an auxiliary component can include a plurality of parts or combined components. In certain aspects, the auxiliary member can be attached using a braze joint or weld.

Figure 3A:
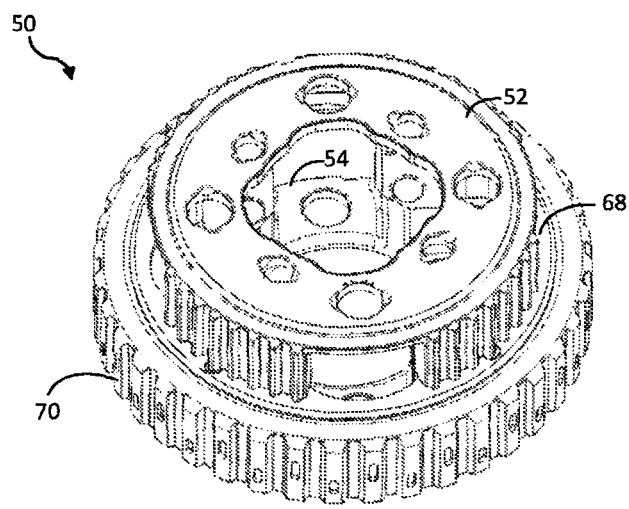
FIG. 3A is a first perspective view of the carrier assembly of FIG. 2, further including a sleeve member and brake hub.
Figure 3B:
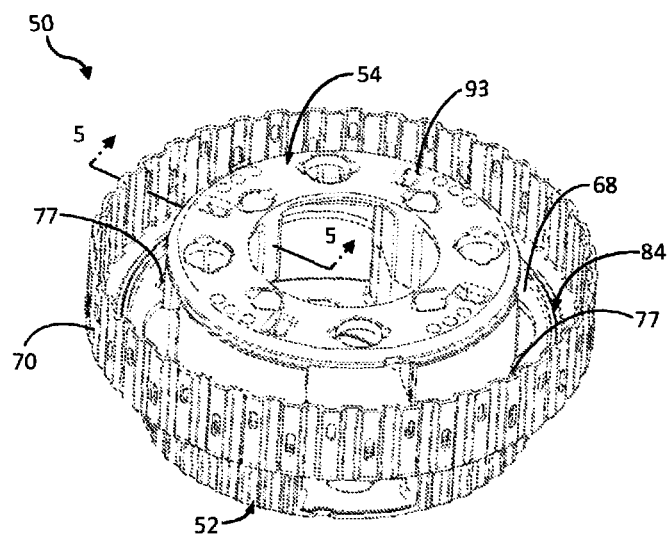
FIG. 3B is a second perspective view of the carrier assembly of FIG. 2, further including a sleeve member and brake hub.

FIG. 3A is a first perspective view of the carrier assembly 50 of FIG. 2 further including an annular sleeve member 68 and an annular brake hub 70, shown with the carrier member 52 facing an upward direction. FIG. 3B is a second perspective view of the carrier assembly 50 of FIG. 2 further including the sleeve member 68 and the brake hub 70, shown with the cover member 54 facing an upward direction. FIG. 4 is an exploded perspective view of the Ravigneaux carrier assembly 50 of FIGS. 2 and 3.

Figure 5A:
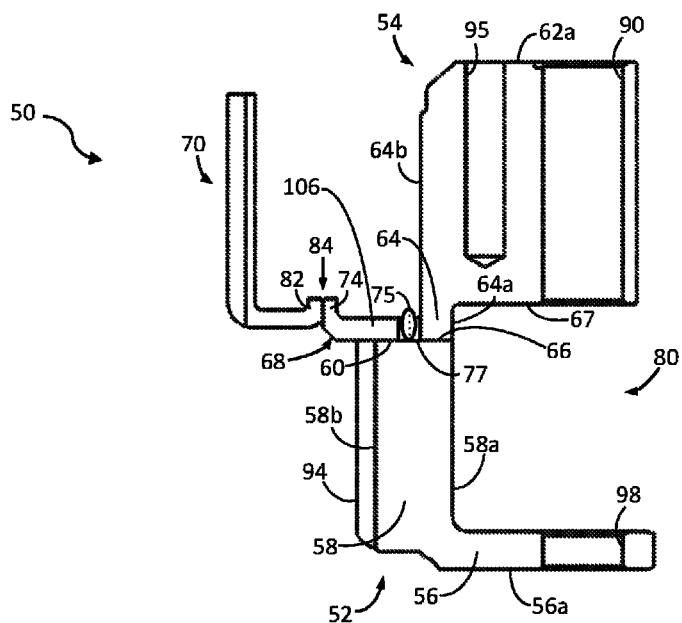
FIG. 5A is a partial cross-sectional view of FIG. 3B taken along the line 5-5 and showing a braze pellet retained within a braze material retention aperture prior to sintering.
Figure 5B:
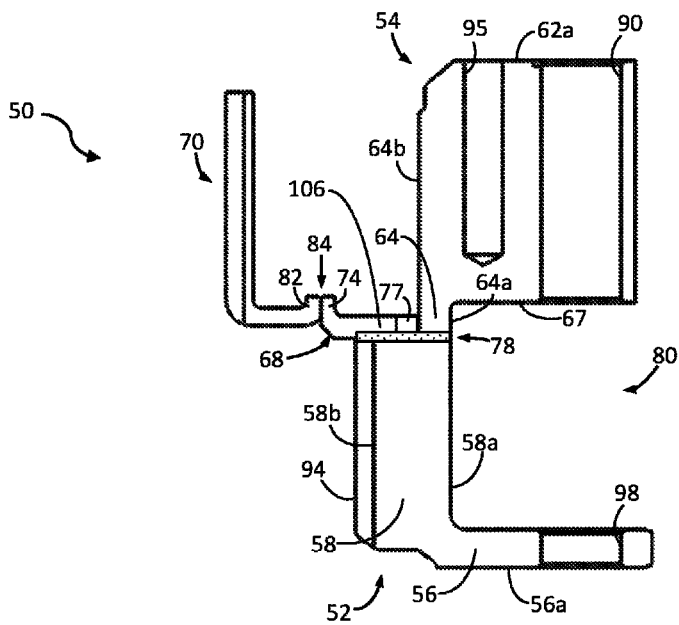
FIG. 5B illustrates the partial cross-sectional view of FIG. 5A after a sintering process.

In various aspects, the sleeve member 68 can be secured to the carrier assembly by a braze joint or weld. When using a braze joint, the sleeve member 68 should be able to generally withstand the temperatures of a sintering process. FIG. 5A is a partial cross-sectional view of FIG. 3B taken along the line 5-5, showing additional details of the carrier assembly 50, including an exemplary braze material, such as a braze pellet 75, located and retained within a braze material retention aperture 77 prior to sintering. FIG. 5B illustrates the partial cross-sectional view of FIG. 5A after a sintering process, with the braze material dispersed by capillary action forming a braze joint 78 between a portion of the carrier member 52, a portion of the cover member 54, and a portion of the sleeve member 68. Although FIG. 5A illustrates the brake hub 70 for completeness, the brake hub 70, or any other auxiliary member, may be attached after the sintering process.

As detailed in FIGS. 5A and 5B, at least a portion of an area 106 adjacent an inner perimeter 72 of the steel sleeve member 68 is secured to the carrier assembly 50 adjacent the free ends 60, 66 of the respective carrier legs 58 and cover leg 64. Thus, the carrier member 54 is joined to a portion of both the sleeve member 68 and the cover member 54. As shown, the respective ends 60 of the carrier legs 58 and ends 66 of the cover legs 64 are aligned with and secured to one another by respective braze joints 78 disposed in a single plane. In certain aspects, the auxiliary component, here the steel sleeve member 68, may also secured to the carrier assembly 50 with the braze joint 78 in the same single plane. As shown, the respective carrier leg 58 and cover leg 64 define respective inner surfaces, or walls 58a, 64a that may be aligned substantially flush with one another, and respective outer surfaces, or walls 58b, 64b, that may be offset from one another at the location of the braze plane, which may provide a suitable joining surface for the auxiliary member.

In certain aspects, at least one of the carrier legs 58 and cover legs 64 may also define a braze material retention feature (not shown) in which a suitable braze material can be placed prior to the sintering. For example, the end 60 of the carrier leg 58 or the end 66 of the cover leg 64 may include a small aperture or bore defined therein, suitable for holding the braze material in place. In other aspects, another auxiliary member may additionally or alternatively provide suitable braze material retention features. In still other aspects, portions of the legs 58, 64 may be shaped to guide a braze material to the appropriate joint area during a sintering process.

The arrangement of the carrier member 52 and the cover member 54 at least partially defines an interior cavity 80 within the carrier assembly 50 configured to house a plurality of pinion gears and various other related components. It should be understood that the shapes of the carrier member 52 and cover member 54 may include many variations. For example, while the bottom of the cover member 54 is shown defining two substantially parallel planes 66, 67, in certain designs, there may be only one plane such that the free end 66 is aligned with plane 67. In various aspects, the carrier assembly 50 may include four spaced-apart cover legs 64 joined to a respective set of four spaced-apart carrier legs 58. As shown in FIGS. 5A and 5B, an inner perimeter 82 of the annular brake hub 70 may be secured to an outer perimeter 74 of the steel sleeve member 68, for example, with a weld joint 84 or equivalent fastening mechanism. In certain aspects, the steel sleeve member 68 may be re-shaped and/or press-fit with the brake hub 70 after the sintering process, and the two components may then be welded to one another to create the assembly.

Figure 6A:
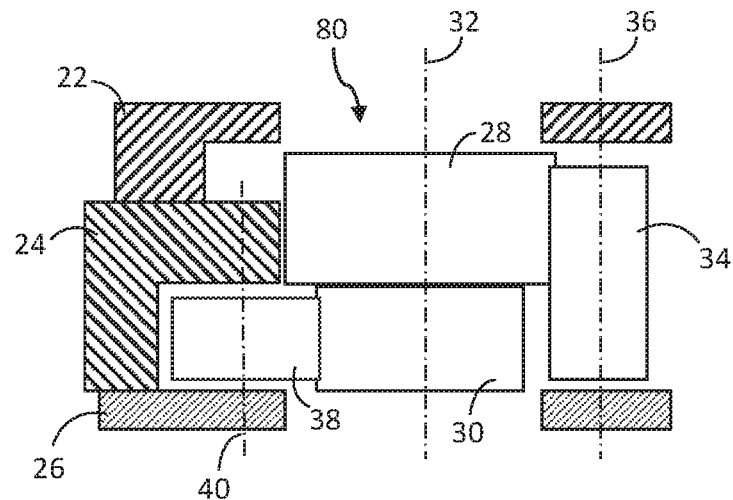
FIG. 6A is a schematic view representing a partial cross-sectional view of the prior art three-piece Ravigneaux assembly of FIG. 1.
Figure 6B:
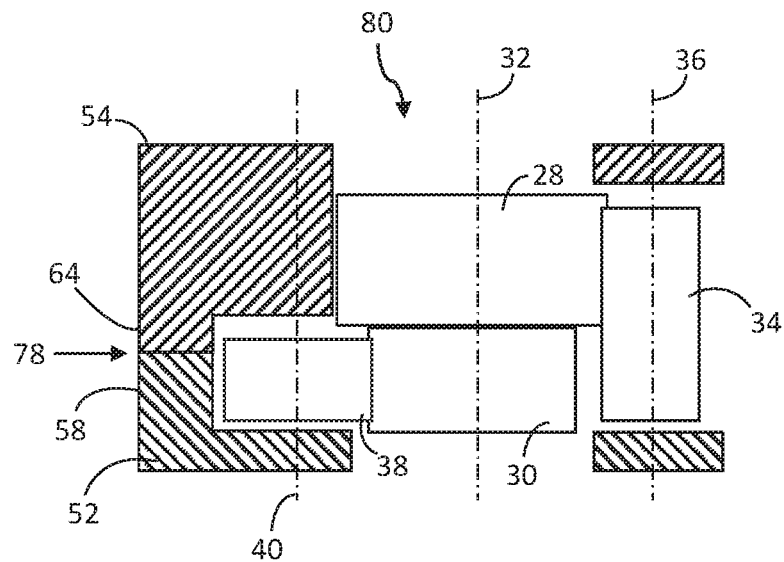
FIG. 6B is a schematic view representing a partial cross-sectional view of the two-piece Ravigneaux carrier assembly of FIG. 2 according to various aspects of the present disclosure.

FIG. 6A is a schematic view representing a partial cross-sectional view of the three-piece prior art Ravigneaux assembly of FIG. 1. For comparison purposes, FIG. 6B is a schematic view representing a partial cross-sectional view of the two-piece Ravigneaux carrier assembly of FIG. 2, according to the present disclosure. Both schematic representations illustrate a configuration with the same large sun gear 28 and small sun gear 30, sharing the same sun axis 36, as well as the same long pinion gear 34 on a long pinion axis 36, and short pinion gear 38 on a short pinion axis 40.

Figure 7:
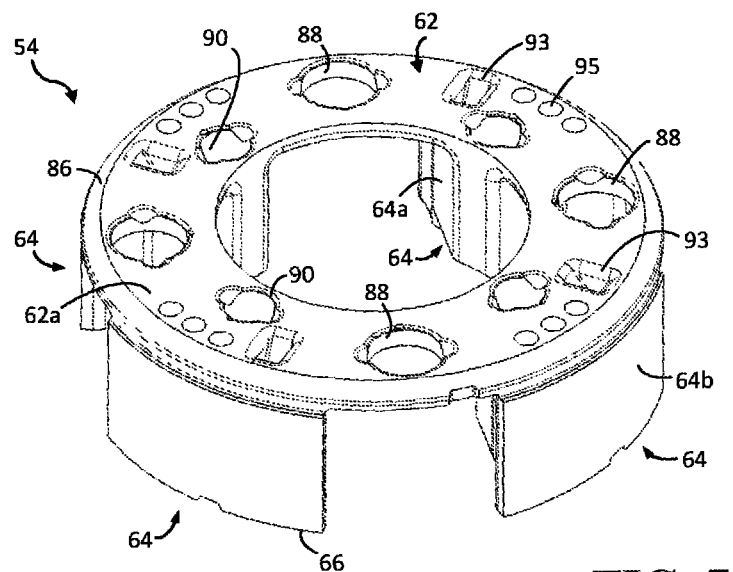
FIG. 7 is a perspective view of a powder metal cover member including a cover plate with integral cover legs extending therefrom.
Figure 8A:
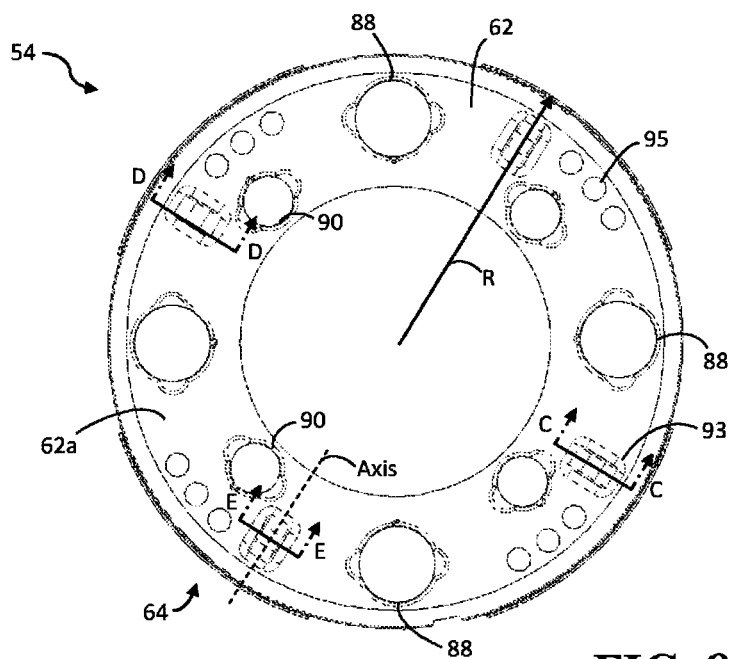
FIG. 8A is a top plan view of the powder metal cover member of FIG. 7.

FIG. 7 is a perspective view of an exemplary powder metal cover member 54 including a body portion, such as cover plate 62 portion, with integral cover legs 64 extending therefrom, and FIG. 8A is a top plan view of the powder metal cover member 54 of FIG. 7. The body portion, or cover plate 62, may be provided with a substantially circular shape defining a radius R, and having a flat, substantially planar major surface, or outer face 62a, with a chamfered or curved edge 86. In various aspects, the curved edge 86 may be made by machining. The various inner walls 64a of the cover legs may be curved or shaped to accommodate the pinion gears and other components. The outer walls 64b of the legs 64 may be substantially aligned with the edge 86 of the outer face 62a. The cover plate 62 may be formed with various apertures and other features formed therein, either during the powder metal manufacturing process or machined thereafter. For example, a first plurality of angularly spaced-apart apertures 88 may be provided for the pinion shafts (not shown) of the long pinion gears 34. Similarly, a second plurality of angularly spaced-apart apertures 90 may be provided for the pinion shafts of the short pinion gears 38. As shown, the second plurality of apertures 90 extend through both the cover plate 62 as well as the cover legs 64, while the first plurality 88 of apertures extend through the cover plate 62 portion only. Additional retention features such as apertures 93, 95 may also be provided. It should be understood that other configurations of the cover member 54 may also be used, depending on the desired design.

Figure 8B:
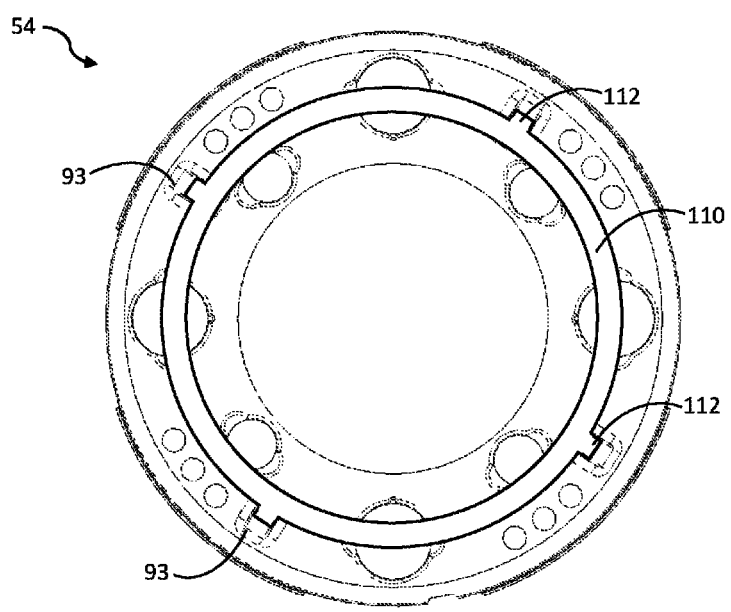
FIG. 8B is a top plan view of the powder metal cover member of FIG. 7 with an exemplary thrust washer.

As stated above, it may be beneficial to couple a radial member or bearing member to at least one powder metal component of a transmission assembly, for example to the body portion 62 of the cover member 54, in order to reduce or maintain low friction between neighboring transmission components moving along the same axis, but with different rotational velocities. In various aspects, the radial member can be any known component that is configured to separate two components that rotate at different speeds, and/or to support radial and axial loads. In one example, the radial member can be a wear-resistant thrust washer. In other examples, if there is an axial force between the components, the radial member can be a race for a thrust bearing. In this regard, FIG. 8B is a top plan view of the powder metal cover member 54 of FIG. 7 with a wear-resistant thrust washer 110 serving as the exemplary radial member having a set of extensions, or claws 112 coupled to the cover member 54 via a set of retention features 93. As described herein, it is envisioned that at least three radially spaced-apart retention features formed in a substantially planar major surface 62a of the body portion of the cover member 54 should be sufficient to receive and couple with coordinating claws 112 extending a distance perpendicular to the thrust washer 110. At the same time, the present technology provides the retention features 93 being shaped such that they can be face-formed, or net-shaped in the cover member while the cover member is formed as a green compact, i.e., prior to a sintering process. FIGS. 8A and 8B illustrate one example with four retention features 93 equally and radially spaced apart from one another, appropriately sized and located for co-rotational movement with the thrust washer 110.

The net-shaped formation of the retention features 93 may minimize the need for additional machining operations after the sintering process. It should be understood that care must be taken to design the retention features 93 such that they can be formed in a green compact without an increased risk of cracking, or potentially damaging the various tools or press/mold components that may be used in the formation of the green compact. FIGS. 8A and 8B specifically show the retention features 93 aligned for receiving the complementary claws 112 of the exemplary thrust washer 110. In various aspects, the retention features are located in an area of the body portion of reduced or low stress zones. In the example of the illustrated cover member 54, each retention feature 93 is formed/pressed in an area adjacent a cover leg 64, which may be provided with a greater thickness area as compared to other areas of the body portion that do not have an extending cover leg 64.

Figure 8C:
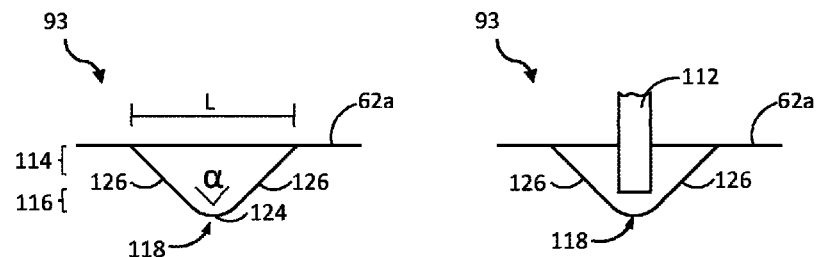
FIG. 8C is a partial cross-sectional view of FIG. 8A taken along the line C-C illustrating a retention feature prior to, and after, receiving a claw from a thrust washer.
Figure 8D:
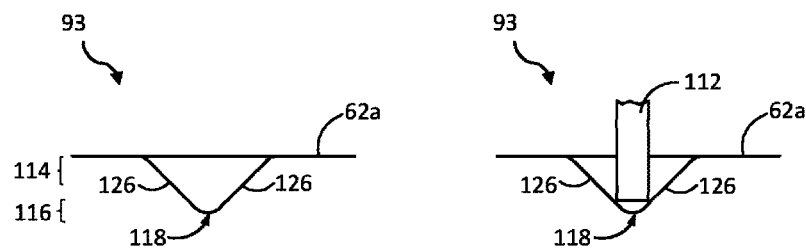
FIG. 8D is a partial cross-sectional view of FIG. 8A taken along the line D-D illustrating a retention feature prior to, and after, receiving a claw from a thrust washer.
Figure 8E:
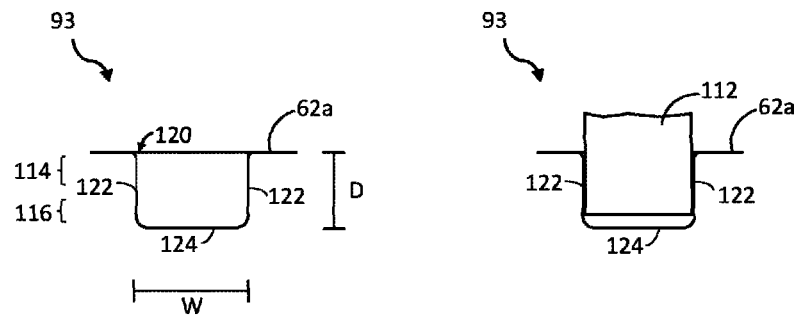
FIG. 8E is a partial cross-sectional view of FIG. 8A taken along the line E-E illustrating a retention feature prior to, and after, receiving a claw from a thrust washer.

For additional details of the retention feature 93, FIGS. 8C, 8D, and 8E are partial cross-sectional views of FIG. 8A taken along the lines C-C, D-D, and E-E, each illustrating a retention feature prior to, and after, receiving a claw 112 from a thrust washer 110. Each retention feature may be pressed into the body portion and defines a length dimension, L (FIG. 8C), a width dimension, W (FIG. 8E), and a depth dimension D (FIG. 8E). Referring to FIGS. 8A and 8C, the length dimension L extends along a longitudinal axis that may be substantially aligned with a radius R of the body portion. As shown, the retention features 93 can be defined as a bore with a shaped geometry extending between an upper region 114 adjacent the major surface, or outer face 62a, and a lower region 116. In various aspects, the lower region 116 may be defined by a radius of curvature 118. The upper region 114 may also have a chamfered edge, or radius of curvature 120 as best shown in FIG. 8E. FIG. 8E illustrates the bore being defined by two opposing and substantially planar side walls 122. FIGS. 8C and 8D illustrate a substantially U-shaped bottom, for example, including a center portion 124 defined by the radius of curvature 118, and two angled bottom walls 126 connected or, or extending from, the center portion 124. In various aspects, the two angled bottom walls 126 cooperate to define an angle α. As a non-limiting example, the figures depict the angle α of about 90 degrees, with each bottom wall generally angled about 45 degrees from the major surface. In various aspects, angles with dimensions of greater than 90 degrees for a may be preferred for being able to further minimize and/or prevent a risk of tool or part cracking. It should be understood, however, that a wider angle may require the use of additional space/surface area on the major surface 62a for a desired depth requirement. In still other aspects, less than 90 degree angles may be preferred depending on the respective dimensions of the claw, the thickness of the body portion, the proximity of the retention feature 93 to other apertures, etc.

Figure 9:
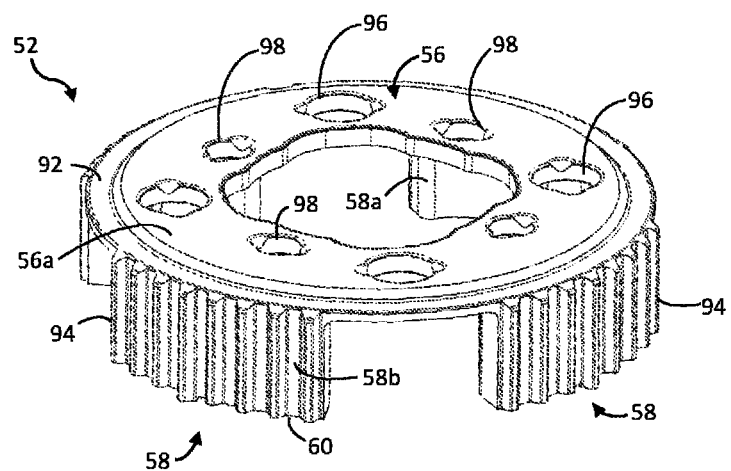
FIG. 9 is a perspective view of a powder metal carrier member including a carrier plate with integral carrier legs extending therefrom.
Figure 10:
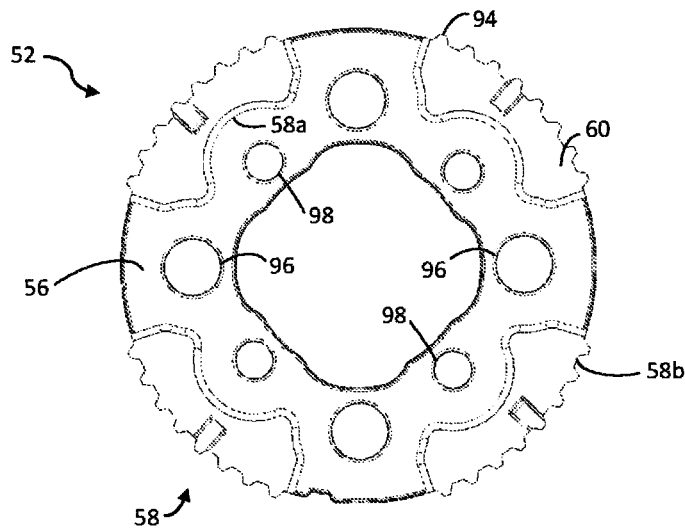
FIG. 10 is a bottom plan view of the powder metal carrier member of FIG. 9.

FIG. 9 is a perspective view of an exemplary powder metal carrier member 52 including a carrier plate 56 portion with integral carrier legs 58 extending therefrom, and FIG. 10 is a bottom plan view of the powder metal carrier member 52 of FIG. 9. The carrier plate 56 may be provided with a substantially circular shape having a flat web surface, or outer face 56a with a lowered or beveled edge 92. In various aspects, the edge 92 may be made by machining. The various inner walls 58a of the carrier legs 58 may be curved or shaped to accommodate the pinion gears and other components. The outer walls 58b of the legs 58 may be substantially aligned with the edge 92 of the outer face 56a, and optionally include spaced-apart splines 94. The carrier plate 56 may be formed with various apertures and other features formed therein, either during the powder metal manufacturing process or machined thereafter. For example, a first plurality of angularly spaced-apart apertures 96 may be provided for the pinion shafts (not shown) of the long pinion gears 34. Similarly, a second plurality of angularly spaced-apart apertures 98 may be provided for the pinion shafts of the short pinion gears 38. As shown, the first and second pluralities of apertures 96, 98 only extend through the carrier plate 56, as the inner walls 58a of the carrier legs 58 are shaped around the second plurality of apertures 98. It should be understood that other configurations of the carrier member 52 may also be used, depending on the design.

Figure 11:
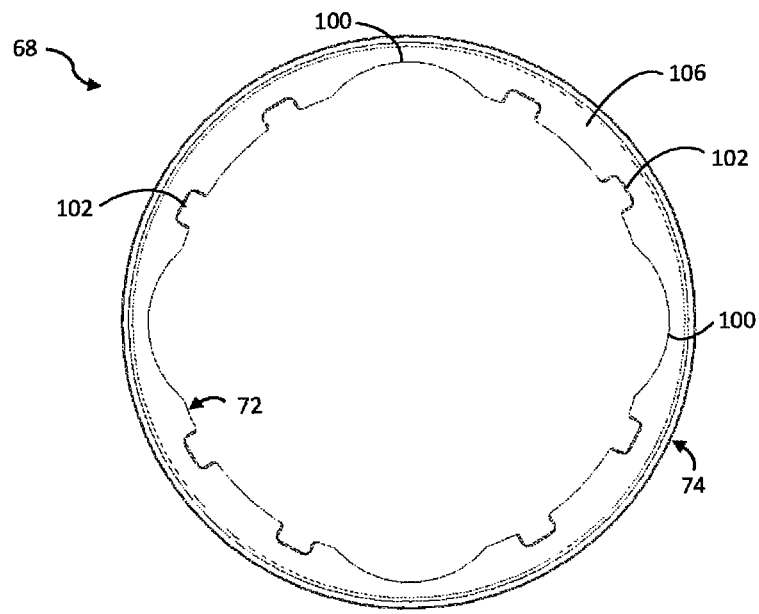
FIG. 11 is a top plan view of an exemplary sleeve member according to various aspects of the teachings of the present disclosure.
Figure 12:
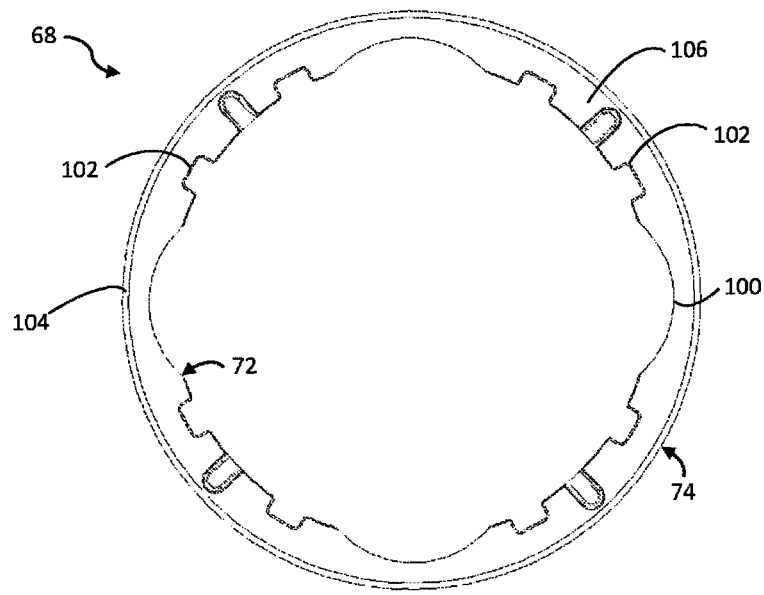
FIG. 12 is a bottom plan view of the exemplary sleeve member of FIG. 11.
Figure 13:
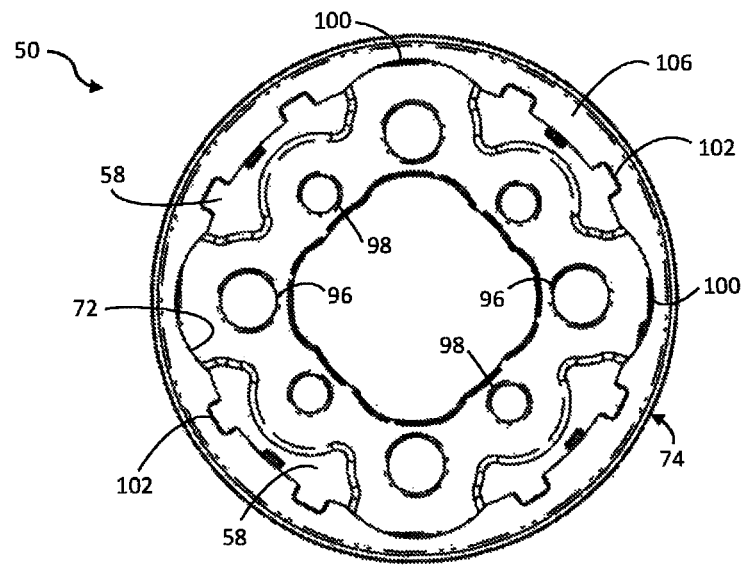
FIG. 13 is a bottom plan view of the powder metal carrier member of FIG. 9, further including a sleeve member.
Figure 14:
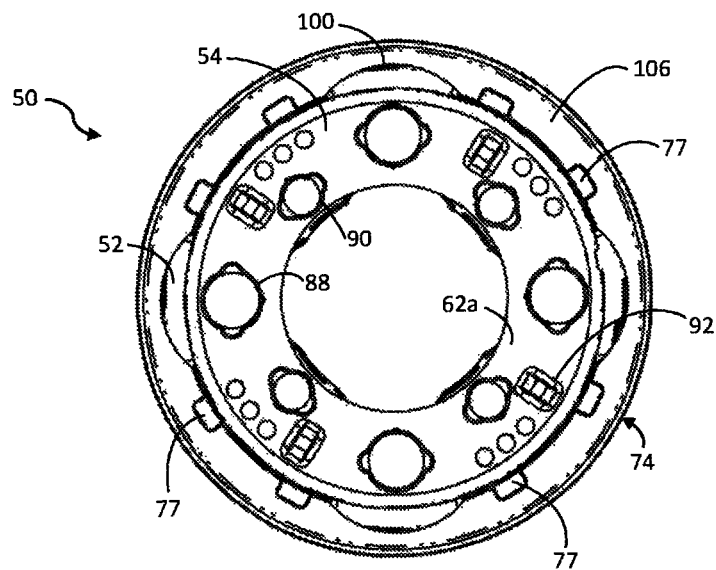
FIG. 14 is a bottom plan view of the assembly of FIG. 13, further including a cover member placed over the carrier member.

FIG. 11 is a top plan view of an exemplary steel sleeve member 68 according to various aspects of the teachings of the present disclosure; and FIG. 12 is a bottom plan view of the sleeve member 68 of FIG. 11. FIG. 13 is a bottom plan view of the carrier member 52 of FIG. 10 including a sleeve member 68 aligned with and disposed on the ends 60 of the plurality of carrier legs 58. FIG. 14 is a bottom plan view of the assembly of FIG. 13, further including the cover member 54 placed over the carrier member 52.

With reference to each of FIGS. 11-14, the sleeve member 68 defines an inner perimeter 72 and an outer perimeter 74. The inner perimeter 72 may be shaped with certain areas having a radius of curvature in order to accommodate the pinions and other components. The outer perimeter 74 of the sleeve member 68 may be provided with an extending annular edge portion 104 that may provide additional strength and be used for welding to other components, such as a brake hub 70, as described above. A portion of the area 106 between the inner perimeter 72 and outer perimeter 74 may be used to secure the sleeve member 68 to the carrier legs 58, as shown in FIG. 5B. The inner perimeter 72 may also be shaped or stamped with cut-out portions 102 that may be configured as braze material retention features that cooperate with other components to form the braze material retention apertures 77. For example, the plurality of braze material retention features 102 cooperate with the carrier member 52 and the cover member 54, in the assembled state, as best shown in FIGS. 3B, 5A, 5B, and 14, to define retention apertures 77 shaped and sized to retain a braze material adjacent a single plane prior to a sintering process forming the braze joint 78 in the single plane. As shown in FIGS. 13 and 14, in certain aspects, at least two spaced-apart braze material retention features 102 may be provided per respective pair of aligned carrier leg and cover leg. The location and number of braze material retention apertures 77 may vary based on the design and strength requirements.

Figure 15:
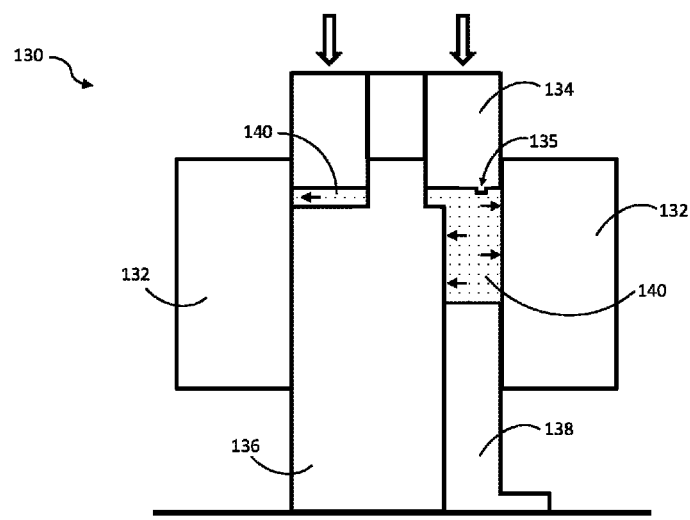
FIG. 15 is a schematic view of an exemplary powder metal die press, illustrating a compression operation.

In still other aspects, the present teachings provide methods for forming various powder metal components having a plurality of net-shaped retention features therein. The methods may include filling a die mold or press with an appropriate powder metal mixture. Once filled, the methods would include applying a pressure to the powder metal mixture to shape a green compact part. In various aspects, the part would be shaped to include at least three spaced-apart retention features defined in a major surface of the green compact. As described in detail above, each retention feature may include a bore defined by two opposing, substantially parallel sidewalls and a substantially U-shaped bottom portion. FIG. 15 is a basic schematic view of an exemplary powder metal die press assembly 130, illustrating a compression operation. Various tools may be inserted into the die before, after, or during the application of pressure to coordinate a final shape of the powder metal component. For example, the press 130 may include non-limiting features such as a die component 132, a front or top tool portion 134, a rib tool portion 136, and a leg tool portion 138. The top tool portion 134 may include a plurality of projections 135 that serve to shape and form the retention features 93 into the pressed green compact part 140. As shown by the directional arrows, pressure applied to the green compact part 140 results in a radial exertion of pressure from the part 140 to the die and tooling.

Figure 16:
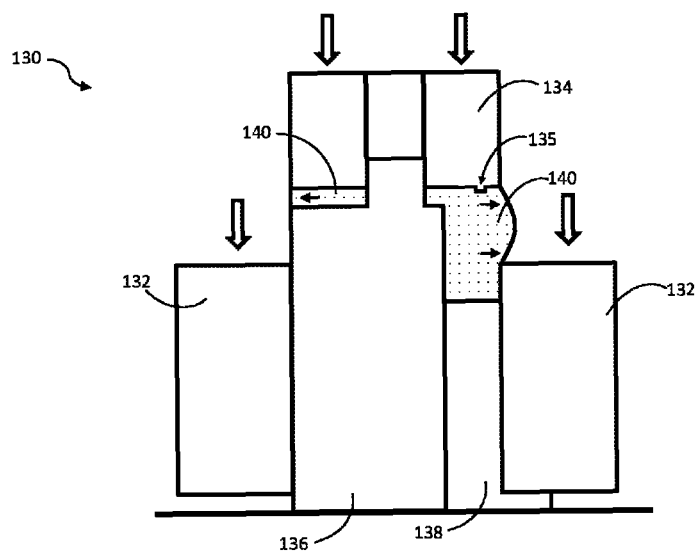
FIG. 16 is a schematic view of the powder metal die press of FIG. 15, illustrating the lowering of a portion of the die with radial expansion of the green compact.

One key consideration in the methods of the present technology is the path a part takes from the pressed state to the released state, for example, in order to separate the part from the die such that it is not disturbed by interference between the part and die during the separation process. Once compressed, the methods may include opening at least a portion of the die and allowing the green compact to expand in a radial direction. This may include raising or lowering, or even removing, a portion of the die mold or assembly 130 with respect to the green compact part 140. Preferably, the expansion occurs in a direction aligned with the longitudinal axis (shown in FIG. 8A) of each respective retention feature. In this regard, there is minimal interference between the green compact part and the protrusions 135 extending from the die mold. FIG. 16 is a schematic view of the powder metal die press of FIG. 15, illustrating the lowering of a portion of the die 132, and further illustrating the radial expansion of the green compact. It should be understood that these figures are schematic in nature, and while the degree to which the expansion occurs can be significant relative to and in relation to the design, and related to the potential propagation of cracks and other tooling issues, the illustrations may be slightly exaggerated in size for ease of understanding this technology.

Figure 17:
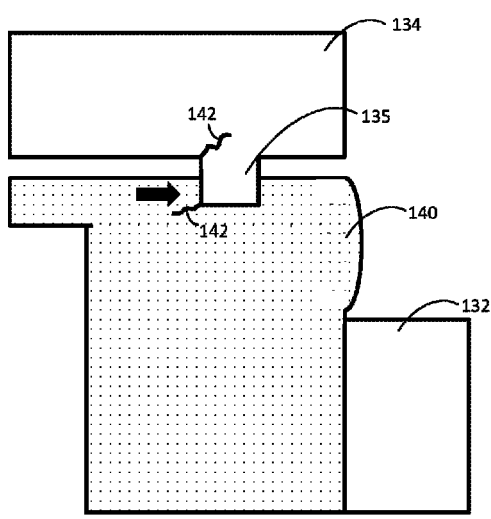
FIG. 17 is a partial magnified view of FIG. 16, representative of a prior art die mold.
Figure 18:
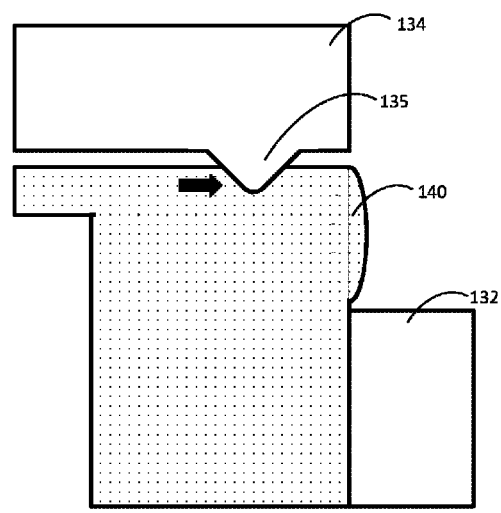
FIG. 18 is a partial magnified view of FIG. 16, according to various aspects of the present technology.

FIG. 17 is a partial magnified view of FIG. 16, representative of a prior art die mold with a substantially cylindrical shaped projection 135 that may cause or increase the potential of cracks 142 or failures of the tool and/or part. FIG. 18 is a partial magnified view of FIG. 16, with a projection 135 shaped to form retention features according to various aspects of the present technology. In various aspects, the projection of the present technology allows the pressed green compact to expand in a radial direction, aligned with a longitudinal axis of each respective retention feature, which allows a portion of the die mold to slidably engage with the bottom walls of the retention features. Such a slidable engagement, or angular movement, may assist in minimizing cracks and failures, particularly during the part separation and ejection process. Once removed from the assembly 130, the part 140 may be sintered according to known parameters.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A powder metal component for a transmission, the powder metal component comprising:
   a body portion defining a substantially planar major surface; and
   at least three radially spaced-apart retention features formed in the body portion in a green state, prior to sintering,
   wherein each retention feature comprises a bore having a shaped geometry extending between an upper region adjacent the major surface of the body portion, and a lower region defining a radius of curvature.

2. The powder metal component according to claim 1, wherein the body portion is circular and each retention feature defines a length dimension extending along a longitudinal axis that is substantially aligned with a radius of the body portion, and a width dimension that is less than the length dimension.

3. The powder metal component according to claim 1, wherein each bore is defined by two opposing, substantially parallel sidewalls and a substantially U-shaped bottom portion.

4. The powder metal component according to claim 3, wherein the substantially U-shaped bottom portion comprises a center region, defined by the radius of curvature, and connecting two angled bottom walls.

5. The powder metal component according to claim 4, wherein the two angled bottom walls cooperate to define an angle of about 90 degrees.

6. The powder metal component according to claim 1, wherein the powder metal component is a cover member for a planetary carrier assembly of an automatic transmission.

7. The powder metal component according to claim 6, wherein the cover member comprises a powder metal cover plate having a plurality of cover legs extending a distance from the cover plate.

8. The powder metal component according to claim 7, wherein each retention feature is located adjacent a respective cover leg.

9. The powder metal component according to claim 8, comprising four equally spaced apart cover legs and four equally spaced-apart retention features disposed in low stress zones of the body portion.

10. The powder metal component according to claim 1, wherein the retention features are aligned and configured for receiving claws from a radial member for co-rotational movement with the radial member.

11. A planetary carrier sub-assembly for aligning rotational components of an automatic transmission, the carrier sub-assembly comprising:
    a radial member comprising a plurality of claws; and
    a powder metal component having a body portion defining:
       a substantially planar major surface; and
       at least three radially spaced-apart retention features formed in the body portion in a green state, prior to sintering, configured for receiving the claws from the radial member for co-rotational movement with the radial member,
    wherein each retention feature comprises a bore having a shaped geometry defined by two opposing, substantially parallel sidewalls and a substantially U-shaped bottom portion.

12. The planetary carrier sub-assembly according to claim 11, wherein the powder metal component is a unitary cover member comprising a cover plate having a plurality of integral cover legs extending therefrom.

13. The planetary carrier sub-assembly according to claim 11, wherein the powder metal component comprises four equally spaced-apart retention features disposed in low stress zones of the body portion.

14. The planetary carrier sub-assembly according to claim 11, wherein the substantially U-shaped bottom portion comprises a center region, defined by a radius of curvature, and connecting two angled bottom walls.

15. The planetary carrier sub-assembly according to claim 11, wherein the radial member comprises a thrust washer or a race for a thrust bearing.

16. A method for forming a powder metal component with a plurality of net-shaped retention features therein, the method comprising:
    filling a die mold with a powder metal mixture;
    applying a pressure to the powder metal mixture to shape a green compact including at least three spaced-apart retention features defined in a major surface of the green compact, each retention feature comprising a bore defined by two opposing, substantially parallel sidewalls and a substantially U-shaped bottom portion;
    opening the die mold and allowing the green compact to expand in a radial direction aligned with a longitudinal axis of each retention feature, thereby minimizing interference between the green compact and protrusions extending from the die mold; and
    sintering the green compact to form the powder metal component.

17. The method according to claim 16, wherein the U-shaped bottom portion comprises a center region defining a radius of curvature and connecting two angled bottom walls.

18. The method according to claim 17, allowing the green compact to expand in a radial direction aligned with a longitudinal axis of each retention feature comprises allowing a portion of the die mold to slidably engage with the bottom walls of the retention features.

19. The method according to claim 16, wherein opening the die mold comprises raising or lowering a portion of the die mold with respect to the green compact.

20. The method according to claim 16, wherein the step of applying pressure to the powder metal mixture comprises inserting at least one tool into the die mold to coordinate a final desired shape of the powder metal component.

* * * * *